(12) United States Patent
Olsen et al.

(10) Patent No.: US 10,707,960 B2
(45) Date of Patent: *Jul. 7, 2020

(54) VLC LOCATION DATA APPLICATIONS IN A RETAIL SETTING

(71) Applicant: Target Brands, Inc., Minneapolis, MN (US)

(72) Inventors: Christopher Olsen, Minneapolis, MN (US); Robert Gilman, Otsego, MN (US); Lew Price, Burnsville, MN (US)

(73) Assignee: TARGET BRANDS, INC., Minneapolis, MN (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/661,324

(22) Filed: Oct. 23, 2019

(65) Prior Publication Data

US 2020/0059298 A1 Feb. 20, 2020

Related U.S. Application Data

(63) Continuation of application No. 16/552,183, filed on Aug. 27, 2019, now Pat. No. 10,498,445, which is a continuation of application No. 15/855,309, filed on Dec. 27, 2017, now Pat. No. 10,447,395, which is a continuation of application No. 15/074,306, filed on Mar. 18, 2016, now Pat. No. 9,893,808.

(51) Int. Cl.
*H04B 10/116* (2013.01)
*G06Q 30/06* (2012.01)

(52) U.S. Cl.
CPC ....... *H04B 10/116* (2013.01); *G06Q 30/0623* (2013.01); *G06Q 30/0639* (2013.01)

(58) Field of Classification Search
None
See application file for complete search history.

(56) References Cited

U.S. PATENT DOCUMENTS

| | | | |
|---|---|---|---|
| 6,340,958 | B1 | 1/2002 | Cantu |
| 7,375,634 | B2 | 5/2008 | Sprague |
| 7,792,711 | B2 | 9/2010 | Swafford, Jr. et al. |
| 7,817,920 | B2 | 10/2010 | Lee |
| 8,395,524 | B2 | 3/2013 | Sunderland et al. |
| 8,752,761 | B2 | 6/2014 | Calvaresse et al. |

(Continued)

FOREIGN PATENT DOCUMENTS

WO WO 2015/115717 8/2015

OTHER PUBLICATIONS https://www.eldoled.com/led-drivers/product-news/visible-light-communication--vlc-/, printed Mar. 18, 2016, 2 pp.

(Continued)

*Primary Examiner* — Casey L Kretzer
(74) *Attorney, Agent, or Firm* — Nixon & Vanderhye P.C.

(57) ABSTRACT

A retail merchandising system includes a plurality of gondolas positioned in a retail space, a plurality of visible light communication (VLC) sources positioned in the retail space, and at least one VLC sensor disposed at a fixed location relative to each of the plurality of gondolas. The plurality of VLC sources and the at least one VLC sensor are configured to cooperatively identify a location of the gondolas in the retail space. With pre-stored planograms and the locations of the store gondolas, product locations can be readily determined. Additionally, the system can determine customer locations and communicate with customers and/or track customer activity.

20 Claims, 1 Drawing Sheet

(56) References Cited

U.S. PATENT DOCUMENTS

| | | |
|---|---|---|
| 8,812,378 B2 | 8/2014 | Swafford, Jr. et al. |
| 8,908,074 B2 | 12/2014 | Oshima et al. |
| 8,957,951 B1 | 2/2015 | Ganick et al. |
| 9,019,412 B2 | 4/2015 | Oshima et al. |
| 9,031,376 B2 | 5/2015 | Ann et al. |
| 9,893,808 B2 | 2/2018 | Olsen et al. |
| 10,447,395 B2 | 10/2019 | Olsen et al. |
| 2006/0145838 A1 | 7/2006 | Alvarez |
| 2008/0000968 A1 | 1/2008 | Cato |
| 2011/0149073 A1 | 6/2011 | Stothers |
| 2013/0041761 A1 | 2/2013 | Voda |
| 2013/0183042 A1 | 7/2013 | Knapp et al. |
| 2013/0317916 A1 | 11/2013 | Gopalakrishnan et al. |
| 2014/0061218 A1 | 3/2014 | Vogler et al. |
| 2014/0255036 A1 | 9/2014 | Jovicic et al. |
| 2014/0270791 A1 | 9/2014 | Hyde et al. |
| 2014/0280316 A1 | 9/2014 | Ganick et al. |
| 2014/0375217 A1 | 12/2014 | Feri et al. |
| 2015/0006319 A1 | 1/2015 | Thomas et al. |
| 2015/0262120 A1 | 9/2015 | Kulig |
| 2015/0280823 A1 | 10/2015 | Breuer |

OTHER PUBLICATIONS http://luxreview.com/article/2015/04/exclusive-us-retail-giant-target-leads-the-way-in-lighting-based-in-store-navigation-systems, printed Mar. 18, 2016, 10 pp.

http://lightingcontrolsassociation.org/visible-light-communication/, printed Mar. 18, 2016, 2 pp.

VLC LOCATION DATA APPLICATIONS IN A RETAIL SETTING

CROSS-REFERENCES TO RELATED APPLICATIONS

This application is a continuation of U.S. patent application Ser. No. 16/552,183 filed Aug. 27, 2019, which is a continuation of U.S. patent application Ser. No. 15/855,309 filed Dec. 27, 2017, now U.S. Pat. No. 10,447,395, issued Oct. 15, 2019, which is a continuation of U.S. patent application Ser. No. 15/074,306, filed Mar. 18, 2016, now U.S. Pat. No. 9,893,808, issued Feb. 13, 2018, the entire content of each of which is hereby incorporated by reference in this application.

STATEMENT REGARDING FEDERALLY SPONSORED RESEARCH OR DEVELOPMENT (NOT APPLICABLE)

BACKGROUND

The invention relates to VLC location data applications in a retail setting and, more particularly, to the use of VLC location technology and pre-stored planogram information to identify product locations and provide customer content.

Networks of devices and algorithms may be used to locate dedicated receivers and/or mobile devices within buildings. Indoor positioning is regarded as a key component of location-aware mobile computing, which refers to applications that utilize a user's location to provide content relevant to the location.

Global Positioning Systems (GPS) lose significant power when passing through construction materials and suffer from multi-path propagation effects that make them unsuitable for indoor environments. Techniques based on received signal strength indication (RSSI) from WiFi and Bluetooth® wireless access points have also been explored. However, indoor environments can cause radio waves to propagate in dynamic and unpredictable ways, limiting the accuracy of positioning systems based on RSSI.

Visible light communication (VLC) is a data communications medium that uses visible light between 400 and 800 THz (780-375 nm). VLC is a subset of optical wireless communications technologies. The technology uses fluorescent lamps (ordinary lamps, not special communications devices) to transmit signals at 10 kb/s, or LEDs for up to 500 Mb/s.

Specially designed electronic devices generally containing a photodiode can receive signals from light sources. A cell phone camera or a digital camera is a satisfactory signal receiver. There also exist dedicated receivers designed specifically for this purpose.

In a retail establishment, especially "big box" retail, it is not uncommon for a store map to be derived from construction plans generated from a CAD program or the like. It is difficult to account for changes or updates made during construction, and as a consequence, store maps may not be accurate enough to cooperate with VLC location technology (which can be accurate to within a few inches or less).

BRIEF SUMMARY

An aisle in a retail store may be defined by back to back shelves (facing adjacent aisles) and end caps at both ends of each shelf combination. This shelf and end cap assembly is typically referred to as a gondola. The products on the shelves may be arranged according to a predefined planogram. If the retail establishment knows the location of the gondolas and it also knows where the products are (or should be) on the shelves based on the planograms, the system can identify exactly where a particular product is in the store.

The system of the preferred embodiments identifies the locations of the gondolas using VLC technology. In an exemplary application, a VLC sensor is affixed at each of four corners of the gondola, and these sensors provide detailed location data to the system in the form of x and y coordinates. The system then accesses pre-stored planogram information to determine product locations based on the detected corners of the gondola. In an alternative embodiment, a single VLC sensor may be used and location data may be extrapolated.

The VLC source(s) may also be accessed by an app on a customer's mobile phone or by a mobile device on a shopping cart. The app could use the mobile phone built-in camera or some other sensor array. The system can use the customer location in the store in combination with product locations to provide location-based content to the customer.

In an exemplary embodiment, a retail merchandising system includes a plurality of gondolas positioned in a retail space, a plurality of visible light communication (VLC) sources positioned in the retail space, and at least one VLC sensor disposed at a fixed location relative to each of the plurality of gondolas. The plurality of VLC sources and the at least one VLC sensor are configured to cooperatively identify a location of the gondolas in the retail space. A system server communicating with the VLC sources and the VLC sensors is programmed to process data received from the VLC sensors to identify the location of the gondolas. A mobile device associated with a customer is configured to receive signals from the VLC sources, and the system server is programmed to determine a location of the mobile device and to communicate with the mobile device and the VLC sensors.

In some embodiments, the VLC sources may be overhead lights in the retail space. The system may include four VLC sensors respectively positioned at four corners of each of the plurality of gondolas. The VLC sources and the VLC sensors may define the location of the gondolas in terms of x and y coordinates relative to boundaries of the retail space. Each of the gondolas may define at least one aisle, and the system server may store a planogram for each aisle. In this context, the system server may be programmed to identify a product location of a specific product in the retail space based on the location of the gondolas and the planograms. The system server may be programmed to identify product information based on the location of the mobile device and the planograms, where the system server communicates the product information to the mobile device. The mobile device may be a tablet computing device attached to a shopping cart. Alternatively or additionally, the mobile device may be a customer smart phone or tablet and/or digital signage in the retail space.

The system server may be programmed to monitor customer dwell time and collect data relating to the dwell time. The system server may be programmed to monitor customer shopping direction and collect data relating to the shopping direction.

The system may additionally include a wireless network, where the system server may communicate with the mobile device via the wireless network, and the mobile device may include a unique address/identifier. In this context, the system server may construct a special packet that combines location information gathered via the VLC sources with the unique address/identifier of the mobile device. In some embodiments, the mobile device may be enabled for location based content to be delivered over the wireless network, where the mobile device is programmed to tag its network MAC address or local IP address along with the location information gathered via the VLC sources.

In another exemplary embodiment, a method of operating a retail establishment using visual light communication (VLC) technology includes the steps of (a) positioning a plurality of gondolas in the retail establishment; (b) positioning a plurality of VLC sources in the retail establishment; (c) positioning at least one VLC sensor at a fixed location relative to each of the plurality of gondolas; (d) identifying a location of the gondolas in the retail space based on signals from the VLC sources and the at least one VLC sensor; and (e) determining a location of a mobile device configured to receive signals from the VLC sources and communicating with the mobile device.

The method may further include storing planogram information in a system server, and identifying a product location of a specific product in the retail space based on the location of the gondolas and the planogram information. Still further, the method may include identifying product information based on the location of the mobile device and the planogram information, and communicating the product information to the mobile device.

In yet another exemplary embodiment, a system includes a plurality of gondolas positioned in a retail space, with the plurality of gondolas aligned in rows and defining shopping aisles between them, and a plurality of visible light communication (VLC) sources positioned in the retail space. At least one VLC sensor is positioned relative to each of the plurality of gondolas. The plurality of VLC sources and the at least one VLC sensor are configured to cooperatively identify a location of the gondolas in the retail space. A system server communicating with the VLC sources and the at least one VLC sensor stores planograms of the products placed in the shopping aisles, where the system server is configured to identify locations of the products in the retail space placed in the shopping aisles based on the locations of the gondolas and the planograms. The system in this exemplary embodiment also includes a wireless network. The system server communicates with the mobile device via the wireless network, and the mobile device includes a unique address/identifier. In this context, the system server constructs a special packet that combines location information gathered via the VLC sources with the unique address/identifier of the mobile device.

BRIEF DESCRIPTION OF THE DRAWINGS

These and other aspects and advantages will be described in detail with reference to the accompanying drawings, in which.

DETAILED DESCRIPTION

Figure 1:
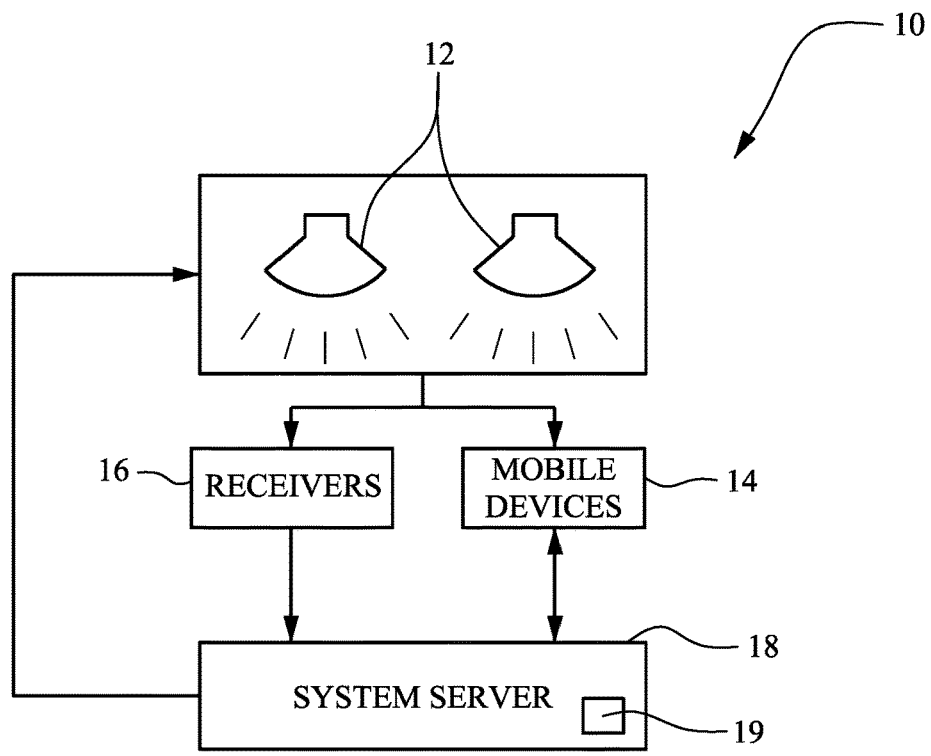
FIG. 1 is a schematic block diagram of an exemplary VLC location service system.

FIG. 1 is a block diagram illustrating an example of a visible light communication (VLC) location service system 10 in accordance with preferred embodiments of the disclosed technology. The system 10 includes multiple VLC-modulated sources 12 that are stationed within an establishment and each configured to send a location signal containing the location of the corresponding VLC source. The VLC sources 12 are preferably implemented as overhead lights such that the transmitted light emanates downward onto the users, e.g., customers or customers in a store, as well as each user's mobile device 14 and any dedicated receivers 16 positioned in the establishment. In the exemplary system, a system server 18 may communicate with the mobile device 14 and/or the dedicated receivers 16 over a wireless communication channel, e.g., using Wi-Fi.

Figure 2:
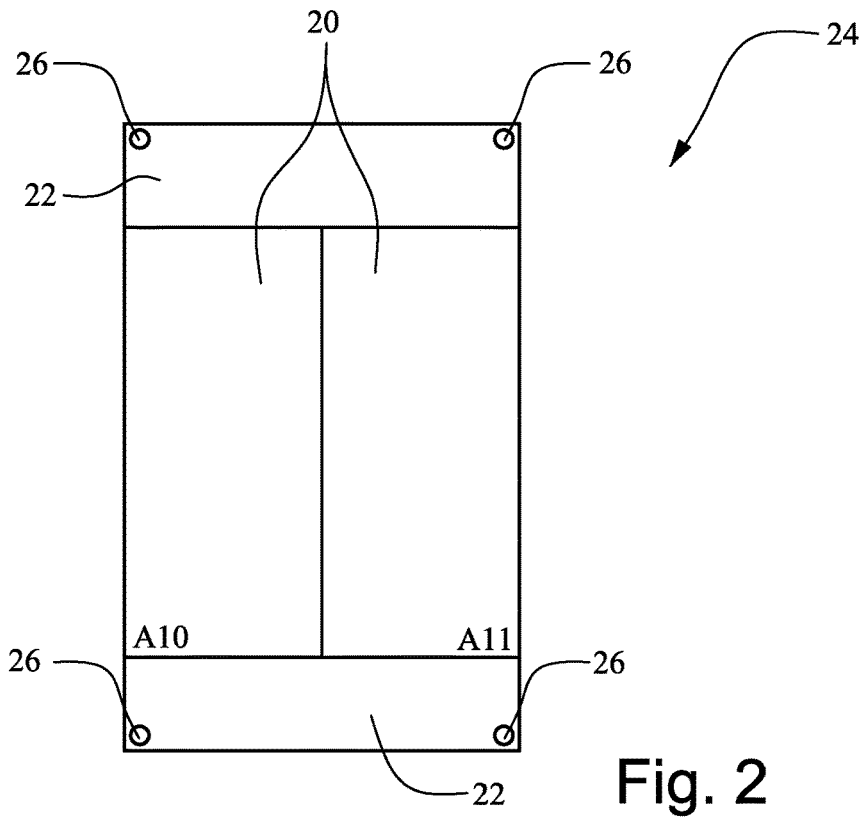
FIG. 2 is a schematic illustration of an exemplary gondola in a retail establishment.

In some embodiments, with reference to FIG. 2, aisles in a retail store may be defined by back to back shelves (facing adjacent aisles) 20 and end caps 22 at both ends of each shelf combination 20. This shelf and end cap assembly 20, 22 may be referred to as a gondola 24. A gondola may alternatively include a single shelf array 20 and/or just one or none of the end caps 22.

Retail establishments may utilize planograms to define where and in what quantity products are placed on the shelves. A planogram is a visual representation of a store's products on the shelves. Product positioning may be important for merchandising, marketing, customer familiarity, and the like. In some embodiments, the planograms typically include enough detail such that if the store knows the location of the gondolas, the store also knows where the products are (or should be) on the shelves. As such, the location of a particular product in the store can be nearly exactly identified once the locations of the gondolas 24 are identified. Retail planograms 19 may be stored in the system server 18.

With continued reference to FIG. 2, in some embodiments, it is desirable to determine the exact location (i.e., within a few inches) of the gondolas using VLC technology. In an exemplary application, a VLC sensor 26 is affixed at each of four corners of the gondola 24, and these sensors 26 provide detailed location data, preferably in the form of x and y coordinates relative to a boundary area defined by the store walls. In some embodiments, the origin or (0,0) point for the x and y coordinates may be defined by one of the building corners, e.g., the far left corner of the building from the store entrance. Pre-stored planogram information may be accessed to determine product locations based on the detected corners of the gondola 24. In an alternative embodiment, a single VLC sensor 26 may be used and location data may be extrapolated. For example, by using a specialized capture application/program that allows for the input of an aisle number, and prompting the user to collect location data, a single device can be used to capture the respective corners of each gondola. This collection process could be further refined so that along with capturing the aisle number, where only one location scan would be necessary, say at the front of the aisle, given that scan angle is also captured, gondola lengths are also known from system data. As a consequence, by knowing the angle and length of the gondola, the system can systemically calculate the location of products on the gondola.

Embodiments of the disclosed technology may be implemented in virtually any type of indoor location or establishment (e.g., a large retail store) that has a number of lighting sources (e.g., lamps or overhead lighting). In certain embodiments, each user, e.g., customer, within the establishment has his or her own mobile device 14 that can be either their own personal smartphone, tablet device, or other handheld electronic device, or an establishment-owned portable device (e.g., a tablet computing device that may be attached to a shopping cart). For example, customers may each carry their own mobile device with them as they travel around a store shopping.

Certain embodiments of the disclosed technology include highly accurate indoor location tracking technology using VLC location signal messages. In terms of physical properties such as range and directivity, VLC characteristics are favorable in terms of delivering indoor location based content with very high accuracy (e.g., within a few inches or less). Such location information can be used for or in connection with discovering a number of useful parameters such as user dwell-times and shopping direction. Communication with a mobile device over a wireless technology other than VLC may be achieved by tagging VLC location-related information to messages.

In certain embodiments, each VLC source may transmit a unique ID announcing its fixed location. A customer's mobile device can be equipped with a VLC receiver such as a photo-diode or photo-sensor array. VLC-enabled light sources may be placed throughout the store and, as the customer moves about the store, the VLC-enabled mobile device may receive one or more location signals that may serve to identify a location of the user's mobile device.

Certain embodiments include the delivery of content to a user that is immediately relevant to the user, e.g., content that translates typically to items that are within the user's and, thus, his or her mobile device's immediate proximity. Such content may be delivered to the user's mobile device as the user walks by specific items in a store or to display appropriate customer-specific content on fixed digital signage screens within the store as he or she walks up to or near each one, for example. VLC location precision can be controlled by deploying an appropriate number of sources and being highly directional in order to deliver high accuracy location information. In this context, the system server 18 can deliver content with regard to items within the customer's immediate proximity based on the location of the gondola 24 relative to the customer and the nearby products determined from the planogram data 19. That is, the system server 18 utilizes the customer location in combination with the locations of the gondolas 24 and the planogram data 19 to identify products within the customer's immediate proximity.

In certain embodiments, it is possible to know the location of user mobile devices and also to communicate with them using an appropriate wireless technology, e.g., WiFi. To enable this, a special packet can be constructed that combines location-related information gathered via VLC technology with the unique address/identifier of the mobile device. For example, location based content may be enabled from the infrastructure or other mobile devices to be delivered over WiFi, in which case the mobile device can tag its WiFi MAC address or local IP address along with the location information gathered via VLC technology. This may enable other devices/infrastructure to know the mobile device location and communicate with the mobile device using an appropriate wireless technology, thus complementing the VLC location tracking capability with the communications capability of virtually any other wireless technology.

Certain implementations may include guiding the customer inside the store to particular item or service. For example, the user's mobile device can act as an indoor global positioning system (GPS) to help guide the user to a specific section or to a specific product in a grocery store.

With the system and methods according to the preferred embodiments, retail product locations can be accurately identified based on gondola locations detected using VLC technology and pre-stored planogram data. The VLC technology is also applicable to mobile devices such as user mobile phones, shopping cart mounted devices, and the like. The system is thus capable of driving content to users based on their location within an establishment.

While the invention has been described in connection with what is presently considered to be the most practical and preferred embodiments, it is to be understood that the invention is not to be limited to the disclosed embodiments, but on the contrary, is intended to cover various modifications and equivalent arrangements included within the spirit and scope of the appended claims.

The invention claimed is:

1. A method of operating a retail establishment using visual light communication (VLC) technology, the method comprising:
   (a) positioning a plurality of gondolas in the retail establishment;
   (b) positioning a plurality of VLC sources in the retail establishment;
   (c) positioning a VLC sensor at a fixed location, wherein a location of the gondolas in the retail establishment is identified based on signals from the plurality of VLC sources and the VLC sensor;
   (d) determining a location of a mobile device configured to receive signals from the VLC sources and communicating via a system server with the mobile device;
   (e) identifying a section location or a product location in the retail space based on the location of the gondolas; and
   (f) the system server communicating at least one of the section location and the product location to the mobile device.

2. A method according to claim 1, wherein step (e) is practiced by identifying the section location, and wherein step (f) is practiced by guiding a user to the section location via the mobile device.

3. A method according to claim 2, wherein step (e) is practiced by identifying the product location, and wherein step (f) is practiced by guiding the user to the product location via the mobile device.

4. A method according to claim 1, wherein step (e) is practiced by identifying the product location, and wherein step (f) is practiced by guiding a user to the product location via the mobile device.

5. A method according to claim 1, wherein the mobile device comprises a user's personal mobile device, and wherein step (f) is practiced by enabling the user's personal mobile device to act as an indoor global positioning system to guide the user to the section location.

6. A method according to claim 1, wherein the mobile device comprises a tablet computing device attached to a shopping cart.

7. A method according to claim 1, further comprising monitoring with the system server customer dwell time and collecting data relating to the dwell time.

8. A method according to claim 1, further comprising monitoring with the system server customer shopping direction and collecting data relating to the shopping direction.

9. A method according to claim 1, the retail establishment having a wireless network, wherein step (f) is practiced via the wireless network.

10. A method according to claim 9, wherein the mobile device comprises a unique address/identifier, the method further comprising constructing with the system server a special packet that combines location information gathered via the VLC sources with the unique address/identifier of the mobile device.

11. An indoor global positioning system for a retail environment including a plurality of gondolas, the indoor global positioning system comprising:
- a plurality of visible light communication (VLC) sources positioned in the retail environment;
- a VLC sensor disposed at a fixed location, the plurality of VLC sources and the VLC sensor being configured to cooperatively identify a location of the gondolas in the retail environment;
- a system server communicating with the VLC sources and the VLC sensor, wherein the system server is programmed to process data received from the VLC sensor to identify the location of the gondolas; and
- a mobile device associated with a customer that is configured to receive signals from the VLC sources, wherein the system server is programmed to determine a location of the mobile device and to communicate with the mobile device and the VLC sensor,
- wherein the system server is programmed to identify a section location or a product location in the retail environment based on the location of the gondolas, and wherein the system server is programmed to communicate at least one of the section location and the product location to the mobile device based on the location of the mobile device.

12. A system according to claim 11, wherein the system server is programmed to identify the section location, and wherein the system server is programmed to guide a user to the section location via the mobile device.

13. A system according to claim 12, wherein the system server is programmed to identify the product location, and wherein the system server is programmed to guide the user to the product location via the mobile device.

14. A system according to claim 11, wherein the mobile device comprises a user's personal mobile device, and wherein the system server is programmed to enable the user's personal mobile device to act as an indoor global positioning system to guide the user to the section location or the product location.

15. A system according to claim 11, wherein the mobile device comprises a tablet computing device attached to a shopping cart.

16. A system according to claim 11, further comprising a wireless network, wherein the system server is programmed to communicate with the mobile device via the wireless network.

17. A system according to claim 16, wherein the mobile device comprises a unique address/identifier, the system server being programmed to construct a special packet that combines location information gathered via the VLC sources with the unique address/identifier of the mobile device.

18. A system according to claim 11, wherein the VLC sources comprise overhead lights in the retail space.

19. A system comprising:
- a plurality of gondolas positioned in a retail space, the plurality of gondolas aligned in rows and defining shopping aisles between them;
- a plurality of visible light communication (VLC) sources positioned in the retail space;
- a VLC sensor positioned relative to each of the plurality of gondolas, the plurality of VLC sources and the VLC sensor being configured to cooperatively identify a location of the gondolas in the retail space;
- a system server communicating with the VLC sources and the VLC sensor; and
- a wireless network,
- wherein a mobile device associated with a customer comprises a unique address/identifier, the system server constructing a special packet that combines location information gathered via the VLC sources with the unique address/identifier of the mobile device, and wherein the system server communicates with the mobile device via the wireless network using the special packet, the system server being programmed to guide the customer to a section location or a product location, thereby enabling the mobile device to act as an indoor GPS.

20. A system according to claim 19, wherein the VLC sources comprise overhead lights in the retail space.

\* \* \* \* \*